US012568451B2

(12) United States Patent
Leng et al.

(10) Patent No.: US 12,568,451 B2
(45) Date of Patent: Mar. 3, 2026

(54) METHOD AND APPARATUS FOR ADJUSTMENT OF SS/PBCH BLOCK BASED MEASUREMENT TIMING CONFIGURATION

(71) Applicant: Samsung Electronics Co., Ltd., Suwon-si (KR)

(72) Inventors: Shiyang Leng, Allen, TX (US); Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 516 days.

(21) Appl. No.: 18/054,528

(22) Filed: Nov. 10, 2022

(65) Prior Publication Data

US 2023/0199680 A1 Jun. 22, 2023

Related U.S. Application Data

(60) Provisional application No. 63/332,555, filed on Apr. 19, 2022, provisional application No. 63/321,449, (Continued)

(51) Int. Cl.
  *H04W 56/00* (2009.01)
  *G01S 19/25* (2010.01)
  *H04W 84/06* (2009.01)

(52) U.S. Cl.
  CPC ......... *H04W 56/001* (2013.01); *G01S 19/258* (2013.01); *H04W 56/005* (2013.01); *H04W 84/06* (2013.01)

(58) Field of Classification Search
  None
  See application file for complete search history.

(56) References Cited

U.S. PATENT DOCUMENTS

2021/0160798 A1    5/2021  Zheng et al.
2021/0204149 A1    7/2021  Kimba dit Adamou et al.
(Continued)

FOREIGN PATENT DOCUMENTS

EP           4221329 A1 *  8/2023  ......... H04B 7/18513
WO     WO-2022029720 A1 *  2/2022  ......... H04B 7/18508
(Continued)

OTHER PUBLICATIONS

"3rd Generation Partnership Project; Technical Specification Group Radio Access Network; Study on New Radio (NR) to support non-terrestrial networks (Release 15)", 3GPP TR 38.811 V15.2.0, Sep. 2019, 126 pages.
(Continued)

*Primary Examiner* — Anh Vu H Ly

(57) ABSTRACT

Methods and apparatuses for adjustment of SMTC configuration in a wireless communication system. A method of a UE comprises: receiving system information including assistance information and an SMTC including offsets for one or more SMTC windows; acquiring location information of the UE; determine, based on the assistance information and the location information, a propagation delay difference between a serving cell of the UE and a neighboring cell; adjust, based on the propagation delay difference, the offsets for one or more SMTC windows; and measuring an SSB received from a neighboring cell within the adjusted one or more SMTC windows.

20 Claims, 13 Drawing Sheets

Related U.S. Application Data filed on Mar. 18, 2022, provisional application No. 63/312,622, filed on Feb. 22, 2022, provisional application No. 63/309,878, filed on Feb. 14, 2022, provisional application No. 63/291,110, filed on Dec. 17, 2021.

(56)         References Cited

U.S. PATENT DOCUMENTS

| | | | | |
|---|---|---|---|---|
| 2022/0360319 A1 * | 11/2022 | Shrestha | ........... | H04W 56/0015 |
| 2023/0284060 A1 * | 9/2023 | Euler | .................... | H04W 24/10 |
| | | | | 370/329 |
| 2023/0396325 A1 * | 12/2023 | Fan | ..................... | H04W 56/001 |
| 2024/0080687 A1 * | 3/2024 | Xiong | .................. | H04W 48/16 |
| 2024/0121744 A1 * | 4/2024 | Suh | ....................... | H04W 60/00 |

FOREIGN PATENT DOCUMENTS

| | | | | |
|---|---|---|---|---|
| WO | WO-2022153574 A1 * | 7/2022 | ......... | H04B 7/18513 |
| WO | WO-2022155177 A1 * | 7/2022 | ......... | H04B 7/18504 |

OTHER PUBLICATIONS

"3rd Generation Partnership Project; Technical Specification Group Radio Access Network; Solutions for NR to support non-terrestrial networks (NTN) (Release 16)", 3GPP TR 38.821 V16.0.0, Dec. 2019, 140 pages.

"5G; NR; Radio Resource Control (RRC); Protocol specification (3GPP TS 38.331 version 16.4.1 Release 16)", ETSI TS 138 331 V16.4.1, Apr. 2021, 932 pages.

"5G; NR; User Equipment (UE) radio access capabilities (3GPP TS 38.306 version 16.6.0 Release 16)", ETSI TS 138 306 V16.6.0, Oct. 2021, 155 pages.

International Search Report and Written Opinion issued Mar. 14, 2023 regarding International Application No. PCT/KR2022/019894, 8 pages.

Oppo, "Discussion on mobility management for connected mode UE in NTN", 3GPP TSG-RAN WG2 Meeting #114-e, R2-2104816, May 2021, 4 pages.

Mediatek Inc., "Efficient Configuration of SMTC and Measurement Gaps in NR-NTN", 3GPP TSG-RAN WG2 Meeting #113-e, R2-2100258, Jan. 2021, 5 pages.

Intel Corp., "Report of [post113-e][108][NTN] SMTC and measurement gap (Intel)", 3GPP TSG-RAN WG2 Meeting #113bis-e, R2-2102866, Apr. 2021, 35 pages.

Extended European Search Report issued Mar. 7, 2025 regarding Application No. 22907842.3, 11 pages.

CATT, "Summary of offline 106_SMTC and gaps_second round (CATT)", 3GPP TSG-RAN WG2 Meeting #112E, R2-2010795, Nov. 2020, 21 pages.

* cited by examiner

700

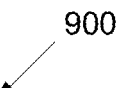

900

UE receives serving cell and/or neighbour cell system information with assistance information including an epoch time, and/or the feeder link delay difference, and/or the change rate of the feeder link delay difference, and/or the rate variation of the feeder link delay, and/or an validity duration.

902

UE acquires location information and calculates the service and feeder link delay differences between the serving cell and a neighbor cell at a time instance based on its location, the serving cell and neighbor cell ephemeris, and the assistance information.

904

UE determines the SMTC offset between the serving cell and the neighbor cell, and detects and measures SSBs of the serving cell and the neighbor cell within the measurement window.

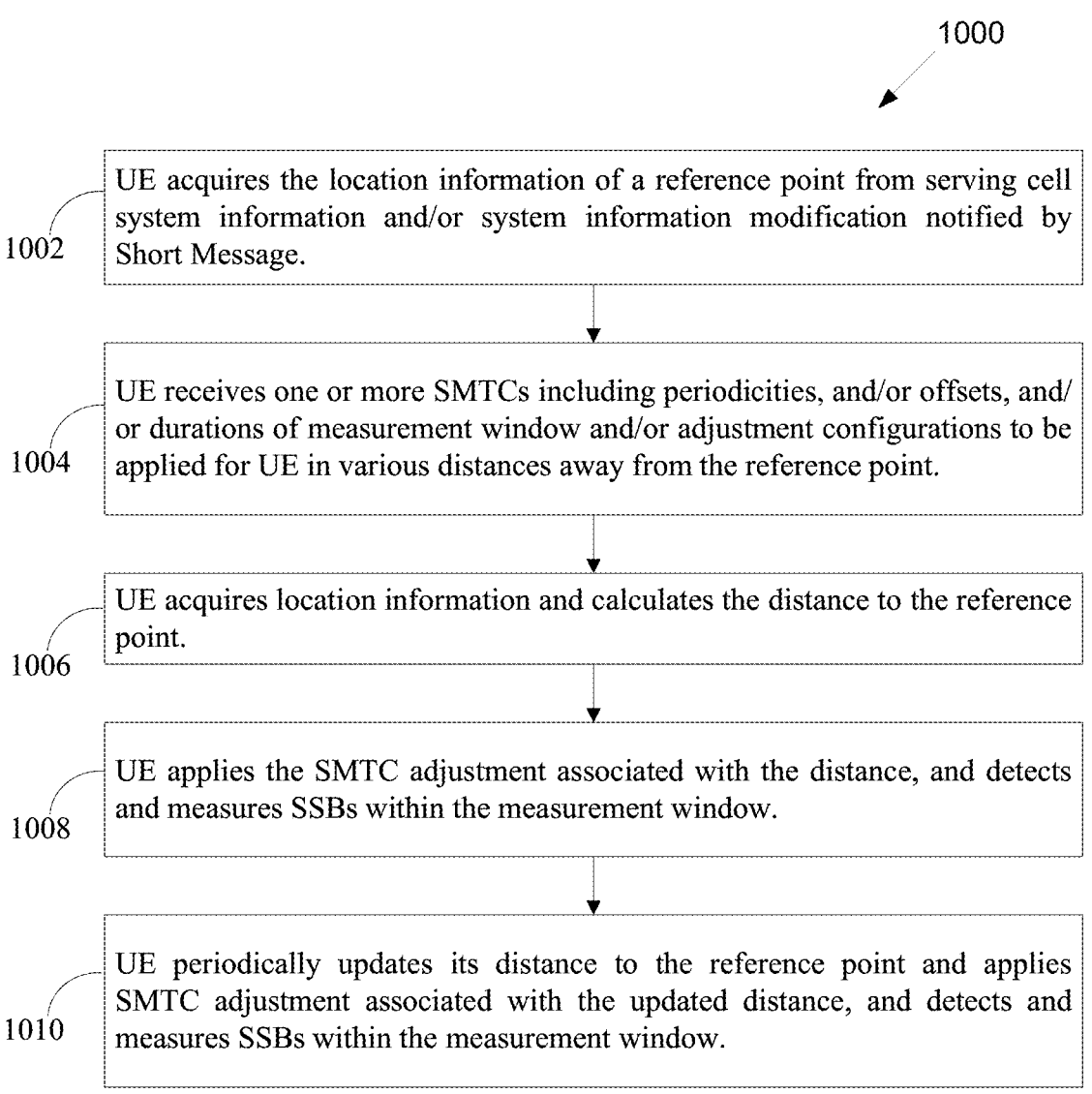

1002 — UE acquires the location information of a reference point from serving cell system information and/or system information modification notified by Short Message.

1004 — UE receives one or more SMTCs including periodicities, and/or offsets, and/or durations of measurement window and/or adjustment configurations to be applied for UE in various distances away from the reference point.

1006 — UE acquires location information and calculates the distance to the reference point.

1008 — UE applies the SMTC adjustment associated with the distance, and detects and measures SSBs within the measurement window.

1010 — UE periodically updates its distance to the reference point and applies SMTC adjustment associated with the updated distance, and detects and measures SSBs within the measurement window.

FIG. 10

METHOD AND APPARATUS FOR ADJUSTMENT OF SS/PBCH BLOCK BASED MEASUREMENT TIMING CONFIGURATION

CROSS-REFERENCE TO RELATED APPLICATIONS AND CLAIM OF PRIORITY

The present application claims priority to:
U.S. Provisional Patent Application No. 63/291,110, filed on Dec. 17, 2021;
U.S. Provisional Patent Application No. 63/309,878, filed on Feb. 14, 2022;
U.S. Provisional Patent Application No. 63/312,622, filed on Feb. 22, 2022;
U.S. Provisional Patent Application No. 63/321,449, filed on Mar. 18, 2022; and
U.S. Provisional Patent Application No. 63/332,555, filed on Apr. 19, 2022.

The contents of the above-identified patent documents are incorporated herein by reference.

TECHNICAL FIELD

The present disclosure relates generally to wireless communication systems and, more specifically, the present disclosure relates to adjustment of synchronization signal/physical broadcasting channel (SS/PBCH) block based measurement timing configuration in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to adjustment of SS/PBCH block based measurement timing configuration in a wireless communication system.

In one embodiment, a user equipment (UE) in a wireless communication system is provided. The UE comprises a transceiver configured to receive system information including assistance information and a synchronization signal/physical broadcast channel block (SSB)-based measurement timing configuration (SMTC) including offsets for one or more SMTC windows. The UE further comprises a processor operably coupled to the transceiver, the processor configured to: acquire location information of the UE; and determine, based on the assistance information and the location information, a propagation delay difference between a serving cell of the UE and a neighboring cell; and adjust, based on the propagation delay difference, the offsets for one or more SMTC windows; and measure SSBs received from a neighboring cell within the adjusted one or more SMTC windows.

In another embodiment, a base station (BS) in a wireless communication system is provided. The BS comprises a processor and a transceiver operably coupled to the processor, the transceiver configured to transmit, to a UE, system information including assistance information and an SMTC including offsets for one or more SMTC windows, wherein the assistance information indicates adjustment to one or more SMTC windows for measurement of SSBs of a neighboring cell of the UE.

In yet another embodiment, a method of a UE in a wireless communication system, the method comprises: receiving system information including assistance information and an SMTC including offsets for one or more SMTC windows; acquiring location information of the UE; and determine, based on the assistance information and the location information, a propagation delay difference between a serving cell of the UE and a neighboring cell; and adjust, based on the propagation delay difference, the offsets for one or more SMTC windows; and measuring SSBs received from a neighboring cell within the adjusted one or more SMTC windows.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 illustrates a flowchart of method for a SMTC(s)/ measurement gap(s) adjustment with assistance information in system information for a UE in an idle/inactive state according to embodiments of the present disclosure;

FIG. 10 illustrates a flowchart of method for a SMTC(s)/ measurement gap(s) adjustment based on system information modification for a UE in an idle/inactive state according to embodiments of the present disclosure;

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The following documents are hereby incorporated by reference into the present disclosure as if fully set forth herein: 3GPP, TR 38.811 v15.2.0, "Study on NR to support non-terrestrial networks"; 3GPP, TR 38.821 v16.0.0, "Solutions for NR to support non-terrestrial networks (NTN)"; 3GPP, TS 38.331 v16.4.1, "5G; NR; Radio Resource Control (RRC); Protocol specification"; and 3GPP, TS 38.306 v16.6.0, "5G; NR; User Equipment (UE) radio access capabilities."

Figure 1:
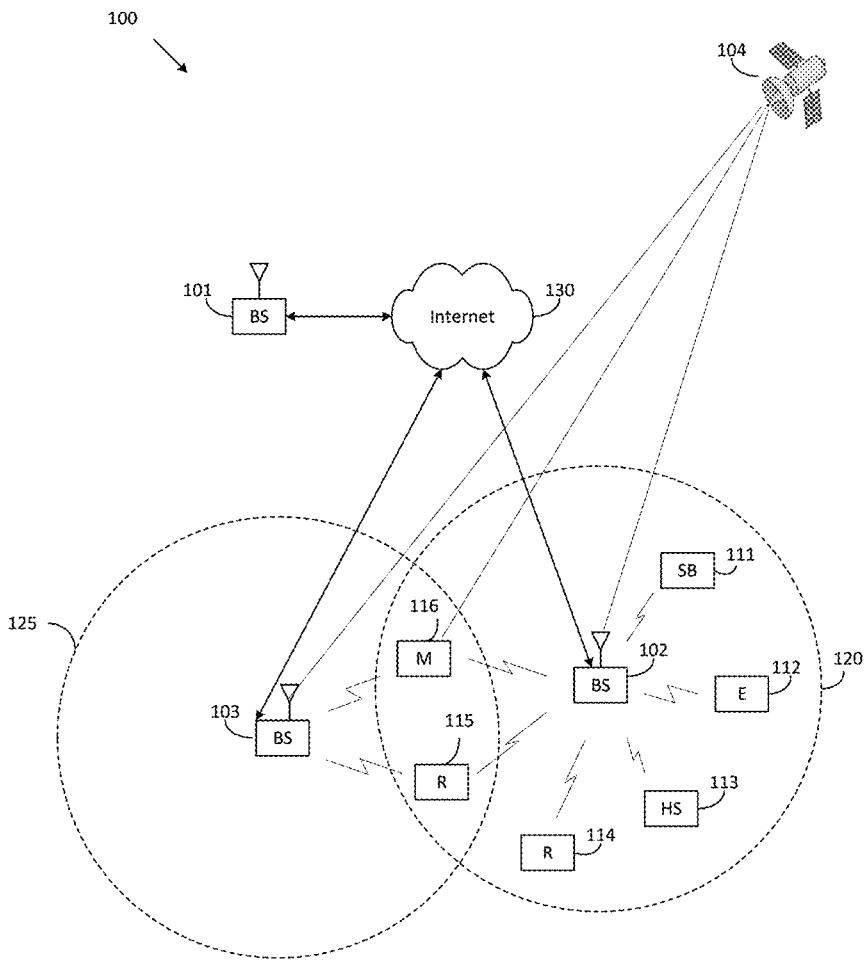
FIG. 1 illustrates an example of wireless network according to embodiments of the present disclosure.
Figure 2:
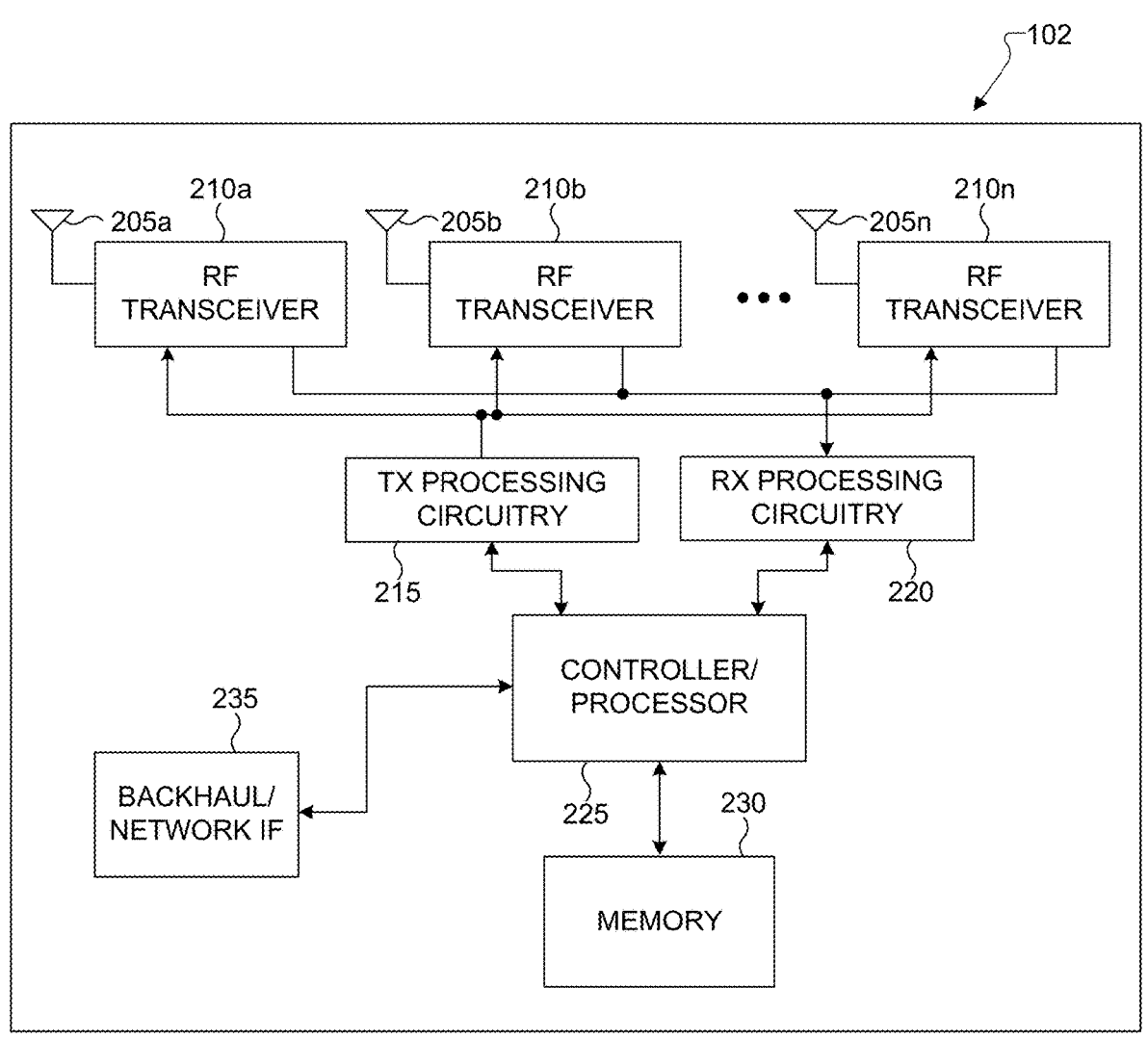
FIG. 2 illustrates an example of gNB according to embodiments of the present disclosure.
Figure 3:
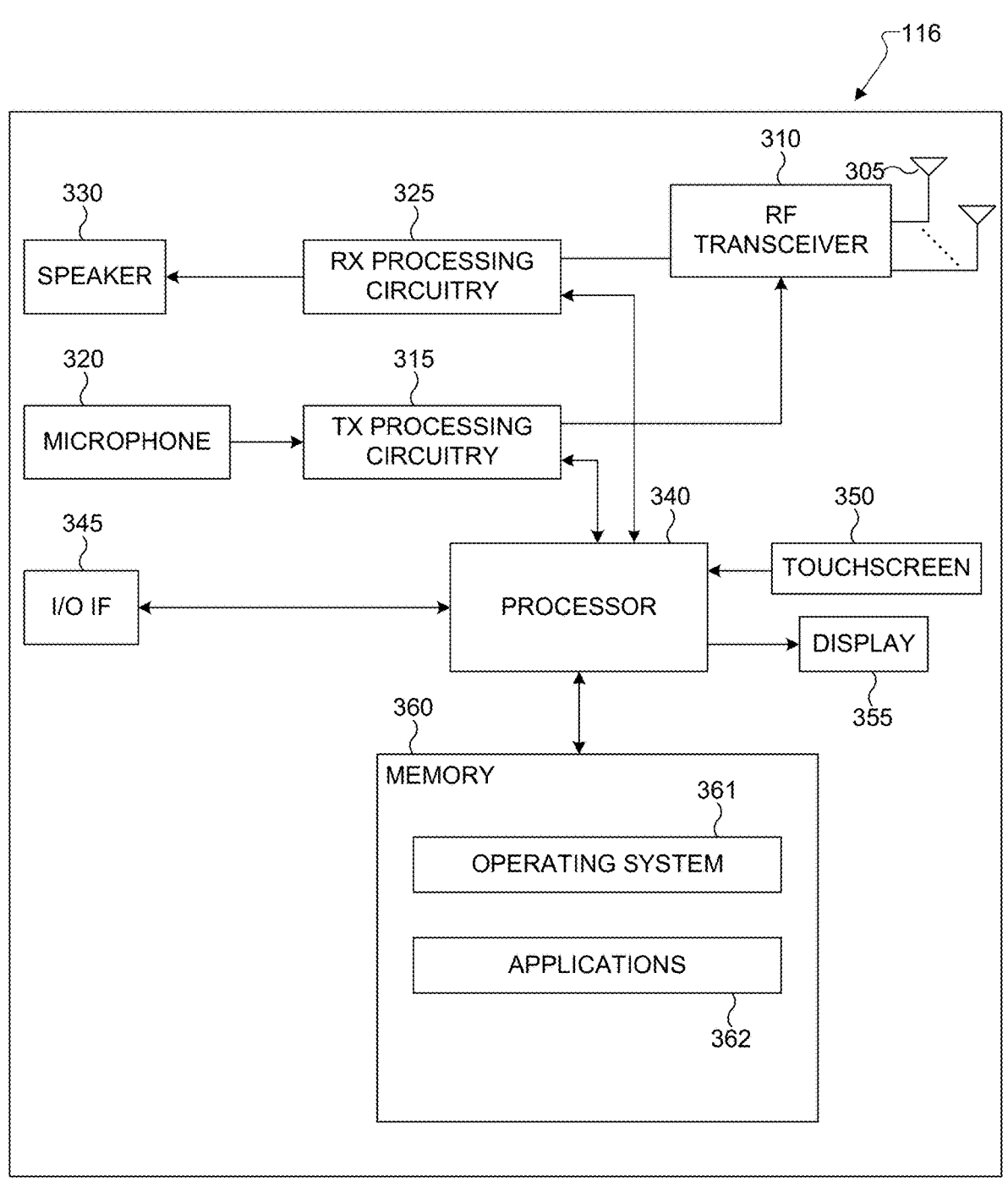
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, an adjustment of SS/PBCH block based measurement timing configuration in a wireless communication system. In certain embodiments, and one or more of the gNBs 101-103 includes circuitry, programing, or a combination thereof, for adjustment of SS/PBCH block based measurement timing configuration in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As described in more detail below, one or more of the UEs 111-116 include circuitry, programing, or a combination thereof for an adjustment of SS/PBCH block based measurement timing configuration in a wireless communication system including: information corresponding to location coordinates for a non-terrestrial network (NTN) gateway; information corresponding to a processing delay between the UE and a base station (BS); and information corresponding to a reference point location; determining a timing advance based on a timing difference between the reference point location and the BS; and transmitting a timing advance report based on the determined timing advance. One or more of the gNBs 101-103 includes circuitry, programing, or a combination thereof, for an adjustment of SS/PBCH block based measurement timing configuration in a wireless communication system including: information corresponding to location coordinates for a non-terrestrial network (NTN) gateway; information corresponding to a processing delay between a user equipment (UE) and a base station; and information corresponding to a reference point location; transmitting the system information; and receiving a timing advance report based on a timing advance, wherein the timing advance is based on a timing difference between the reference point location and the base station.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support an adjustment of SS/PBCH block based measurement timing configuration in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for an adjustment of SS/PBCH block based measurement timing configuration in a wireless communication system, including information corresponding to location coordinates for a non-terrestrial network (NTN) gateway. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figures 4, 5:
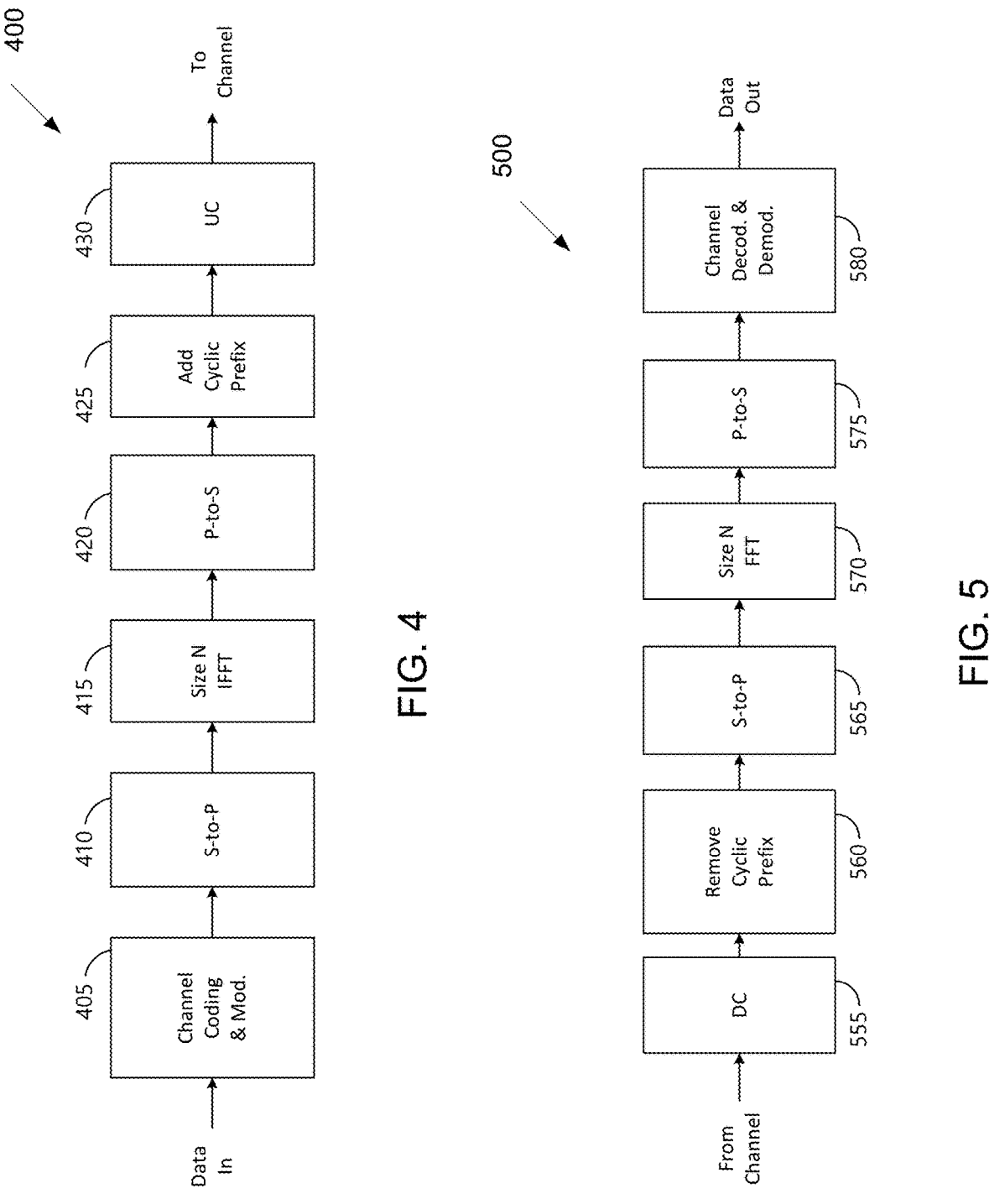
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

3GPP has developed technical specifications and standards to define the new 5G radio-access technology, known as 5G NR. In Release 16 specification, an NTN is supported as a vertical functionality by 5G NR. An NTN refers to a network, or segment of networks using RF resources on board a satellite (or unmanned aircraft system platform). Considering its capabilities of providing wide coverage and reliable service, the NTN is envisioned to ensure service availability and continuity ubiquitously. For instance, the NTN can support communication services in unserved areas that cannot be covered by conventional terrestrial networks, in underserved areas that are experiencing limited communication services, for devices and passengers on board moving platforms, and for future railway/maritime/aeronautical communications as illustrated in 3GPP standard specification.

In 5G NR-TN, a UE measures SS/PBCH blocks (SSBs) of the serving cell and neighbor cells for radio resource measurement (RRM) measurement to perform procedures such as handover to a target cell and maintain radio link quality. In 5G NR as illustrated in 3GPP standard specification, an SSB-based RRM measurement timing configuration (SMTC) is introduced to configure the periodicity, an offset and duration of the measurement window during which a UE can measure SSBs from a serving cell and/or neighbor cells. In NTN, a serving cell and neighbor cells may belong to different satellites, e.g., a serving satellite and a neighbor satellite, and the distance between UE and satellites is large, which can be up to hundreds of kilometers for low earth orbit (LEO) satellites and thousands of kilometers for geosynchronous equatorial orbit (GEO) satellites. The difference of the distance to a serving cell and the distance to a neighbor cell can be larger, that leads to a large propagation delay difference. Moreover, due to the fast movement of satellites, the propagation delay difference varies.

In Release 16 specifications, the UE in an idle/inactive state may apply measurement configuration for a cell reselection contained in system information or an RRC release message and setup the SMTC in accordance with the received periodicityAndOffset parameter (providing periodicity and offset value for the following condition) in the smtc configuration. If smtc2-LP is present, for cells indicated in the pci-List parameter in smtc2-LP in the same frequency (for intra frequency cell reselection) or different frequency (for inter frequency cell re-selection), the UE may setup an additional SMTC in accordance with the received periodicity parameter in the smtc2-LP configuration and use the Offset (derived from parameter periodicityAndOffset) and duration parameter from the smtc configuration for that frequency.

The UE in a connected state may setup the first SMTC in accordance with the received periodicityAndOffset parameter (providing Periodicity and Offset value) in the smtc1 configuration. An smtc1 included in any measurement object with the same ssbFrequency includes the same value. If an smtc2 configuration is present, for cells indicated in the pci-List parameter in smtc2 in the same MeasObjectNR, the UE may setup an additional SMTC in accordance with the received periodicity parameter in the smtc2 configuration and use the Offset (derived from parameter periodicityAndOffset) and duration parameter from the smtc1 configuration. An smtc2 included in any measurement object with the same ssbFrequency has the same value. On the indicated ssbFrequency, the UE may not consider SSB transmission outside the SMTC occasion for SSB measurement.

Considering the varying propagation delay differences from serving cell and neighbor cells leading to varying periodicities and offsets for SSB measurements, the UE may not be able to detect or measure SSBs from a serving cell or neighbor cells within the configured static SMTCs. In order to enable a UE in an idle/inactive state and in a connected state to measure SSBs properly in NTN scenario, the varying propagation delay difference may be taken into account to adjust SMTCs. However, this has not been considered in the current specifications.

In Release 16 specifications, the UE in an idle/inactive state may apply measurement configuration for a cell reselection contained in system information or an RRC release message and setup the SMTC in accordance with the received periodicityAndOffset parameter (providing periodicity and offset value for the following condition) in the smtc configuration. If smtc2-LP is present, for cells indicated in the pci-List parameter in smtc2-LP in the same frequency (for intra frequency cell reselection) or different frequency (for inter frequency cell re-selection), the UE may setup an additional SMTC in accordance with the received periodicity parameter in the smtc2-LP configuration and use the Offset (derived from parameter periodicityAndOffset) and duration parameter from the smtc configuration for that frequency.

The UE in a connected state may setup the first SMTC in accordance with the received periodicityAndOffset parameter (providing periodicity and offset value) in the smtc1 configuration. An smtc1 included in any measurement object with the same ssbFrequency has the same value. If smtc2 configuration is present, for cells indicated in the pci-List parameter in smtc2 in the same MeasObjectNR, the UE may setup an additional SMTC in accordance with the received periodicity parameter in the smtc2 configuration and use the Offset (derived from parameter periodicityAndOffset) and duration parameter from the smtc1 configuration. An smtc2 included in any measurement object with the same ssbFrequency has the same value. On the indicated ssbFrequency, the UE may not consider SSB transmission outside the SMTC occasion for SSB measurement.

Considering the varying propagation delay differences from a serving cell and neighbor cells leading to varying periodicities and offsets for SSB measurements, the UE may not be able to detect or measure SSBs from a serving cell or neighbor cells within the configured static SMTCs. In order to enable a UE in an idle/inactive state and in a connected state to measure SSBs properly in NTN scenario, the varying propagation delay difference may be taken into account to adjust SMTCs. However, this has not been considered in the current specifications.

The disclosed designs in the present disclosure can be applied but not limited to NTN systems. The examples for NTN systems should be considered in inclusive manner, without exclusion of other wireless communication systems.

For a UE in an idle/inactive state, to accommodate varying propagation delays of serving cell and neighbor cells, a UE can autonomously adjust SMTC(s) window and corresponding measurement gap(s) if needed based on the change of propagation delays and the initially received configuration when camping on the selected or reselected serving cell.

Figure 6:
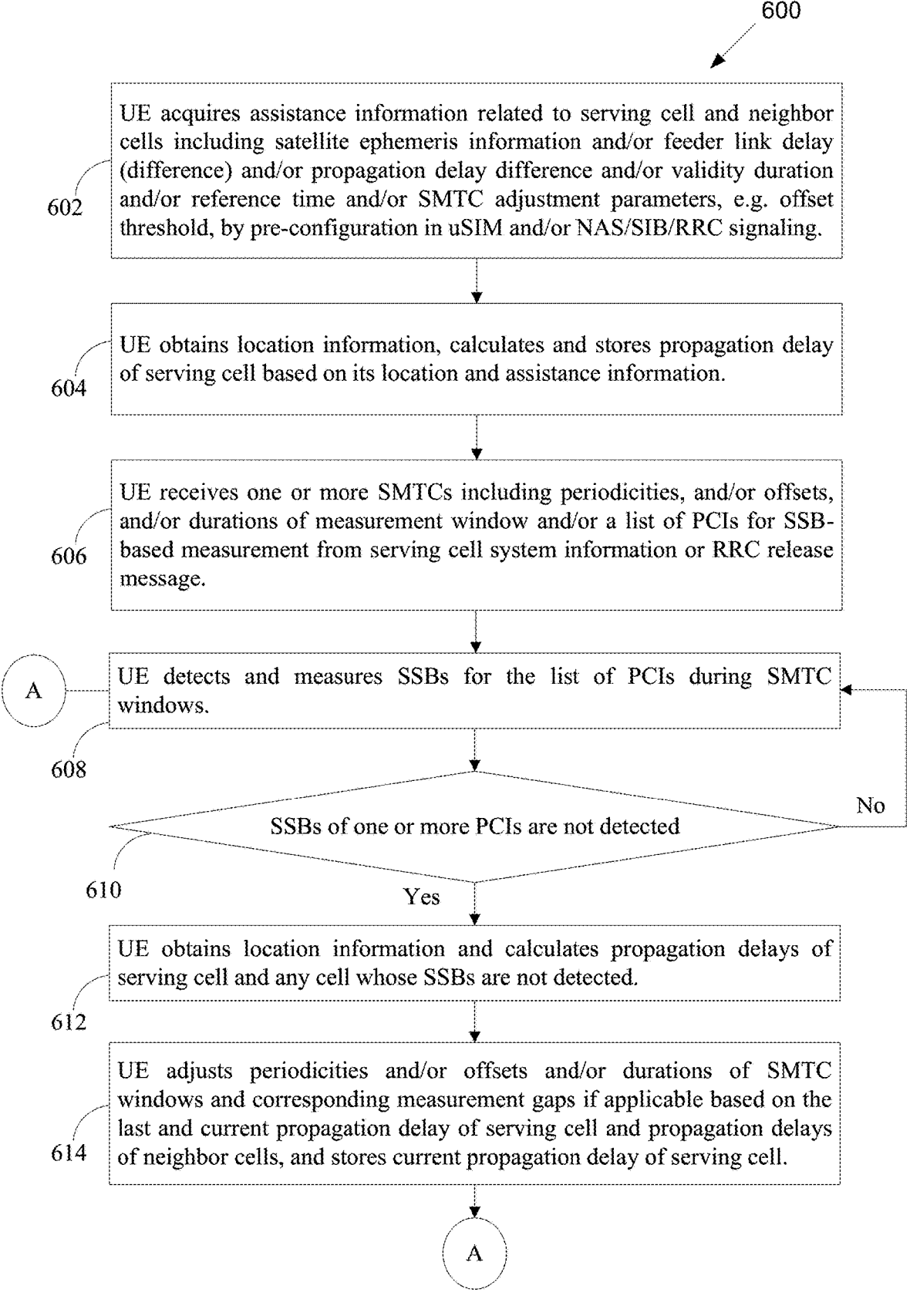
FIG. 6 illustrates a flowchart of method for a SMTC(s)/ measurement gap(s) adjustment with explicit lists of PCIs of cells to measure for UE in an idle/inactive state according to embodiments of the present disclosure.

FIG. 6 illustrates a flowchart of method for a SMTC(s)/measurement gap(s) adjustment with explicit lists of PCIs of cells to measure for UE in an idle/inactive state according to embodiments of the present disclosure. The method 600 as may be performed by a UE (e.g., 111-116 as illustrated in FIG. 1) and a base station (e.g., 101-103 as illustrated in FIG. 1). An embodiment of the method 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

In one embodiment, explicit lists of PCIs of cells is provided to measure as illustrated in FIG. 6.

AS illustrated in FIG. 6, at 602, a UE acquires assistance information related to serving cell and neighbor cells including satellite ephemeris information and/or feeder link delay (difference) and/or propagation delay difference and/or validity duration and/or reference time and/or offset thresholds by pre-configuration in uSIM and/or NAS/SIB/RRC signaling.

At 604, a UE obtains the UE's location information, calculates and stores propagation delay of serving cell based on the UE's location and serving cell ephemeris information and feeder link delay if applicable. UE location information can be obtained via GNSS for GNSS-capable UE or via network-assisted positioning for GNSS-incapable UE. At 606, a UE receives and applies one or more SMTCs including periodicities, and/or offsets, and/or durations of measurement windows and/or a list of PCIs for each SMTC, where the list of PCIs associating with the SMTC indicates the available cell for UE to measure within the SMTC window.

A UE can receive SMTC(s) from serving cell system information in an idle/inactive state or from an RRC release message when transiting from a connected state to an idle/inactive state. At 608, the UE detects and measures SSBs for the list of PCIs during SMTC windows for procedures such as cell re-selection. At 610, if SSBs of all cells in the list of PCIs associated with an SMTC are detectable, the UE continues measurement according to the SMTC. If SSBs of one or more cells in the list of PCIs are not detected within an SMTC window, at 612, the UE can obtain location information via GNSS or network assistance and calculates propagation delays of serving cell and any cell whose SSBs are not detected based on the assistance information.

At 614, the UE can adjust periodicities and/or offsets and/or durations of SMTC windows and corresponding measurement gaps if applicable based on the last and current propagation delay of serving cell and propagation delays of cells whose SSBs cannot be detected. The UE also stores the current propagation delay of the serving cell for adjustment in the future.

Figure 7:
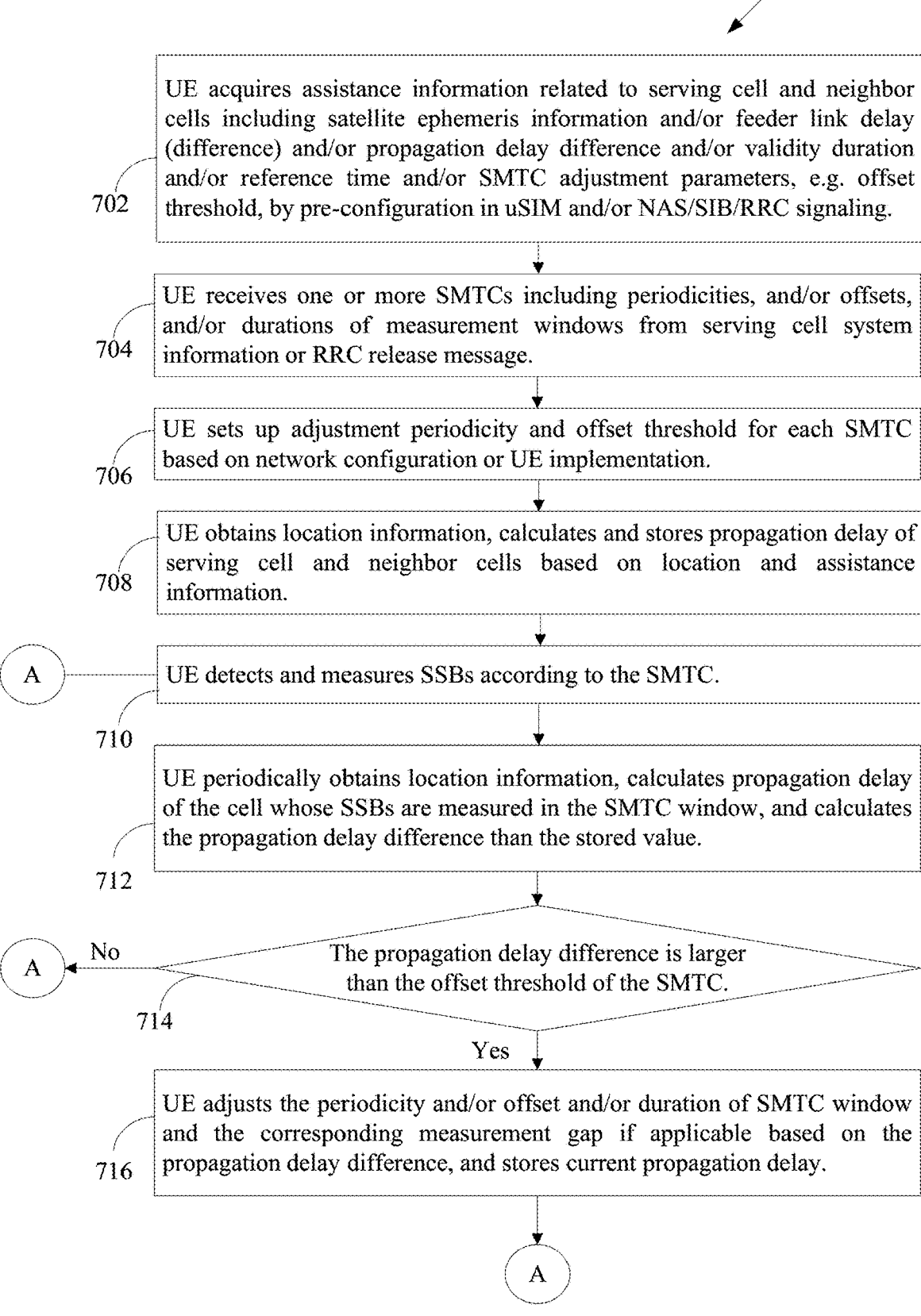
FIG. 7 illustrates a flowchart of method for a SMTC(s)/ measurement gap(s) adjustment without explicit lists of PCIs of cells to measure for a UE in an idle/inactive state according to embodiments of the present disclosure.

FIG. 7 illustrates a flowchart of method 700 for a SMTC(s)/measurement gap(s) adjustment without explicit lists of PCIs of cells to measure for a UE in an idle/inactive state according to embodiments of the present disclosure. The method 700 as may be performed by a UE (e.g., 111-116 as illustrated in FIG. 1) and a base station (e.g., 101-103 as illustrated in FIG. 1). An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

In another embodiment without explicit lists of cells to measure, a UE in an idle/inactive state sets up a validity timer and/or an offset threshold to adjust SMTC(s)/measurement gap(s) as propagation delays of serving cell and/or neighbor cells vary. As shown in FIG. 7, at 702, the UE acquires assistance information related to serving cell and neighbor cells including satellite ephemeris information and/or feeder link delay (difference) and/or propagation delay difference and/or validity duration and/or reference time and/or offset thresholds by pre-configuration in uSIM and/or NAS/SIB/RRC signaling.

At 704, the UE receives and applies one or more SMTCs including periodicities, and/or offsets, and/or durations of measurement windows. The UE can receive SMTC(s) from serving cell system information in the idle/inactive state or from an RRC release message when transiting from a connected state to an idle/inactive state. At 706, the UE sets up an adjustment periodicity and/or an offset threshold for each SMTC based on the assistance information provided by the network, the UE can setup the adjustment periodicity and/or the offset threshold up to the implementation of the UE, e.g., based on ephemeris of serving cell and neighbor cells and the associated validity duration and/or a UE moving pattern.

At 708, the UE obtains the UE's location information, calculates and stores propagation delay of serving cell and neighbor cells based on the UE's location and the assistance information, e.g., ephemeris information and feeder link delay if applicable. The UE location information can be obtained via GNSS for GNSS-capable UE or via network-assisted positioning for GNSS-incapable UE. At 710, for each SMTC, the UE detects and measures SSBs according to the SMTC.

At 712, according to the adjustment periodicity, the UE periodically obtains location information via GNSS or network assistance, calculates propagation delay of the cell(s) whose SSBs are measured in the SMTC window, and calculates the difference than the stored propagation delay of the cell(s). At 714, if the propagation delay difference of any cell is larger than the offset threshold associated with the SMTC, at 716, the UE adjusts the periodicity and/or the offset and/or the duration of SMTC window and the corresponding measurement gap if applicable based on the propagation delay difference. The UE also stores the current propagation delay of cells measured in the SMTC for future adjustments.

Figure 8:
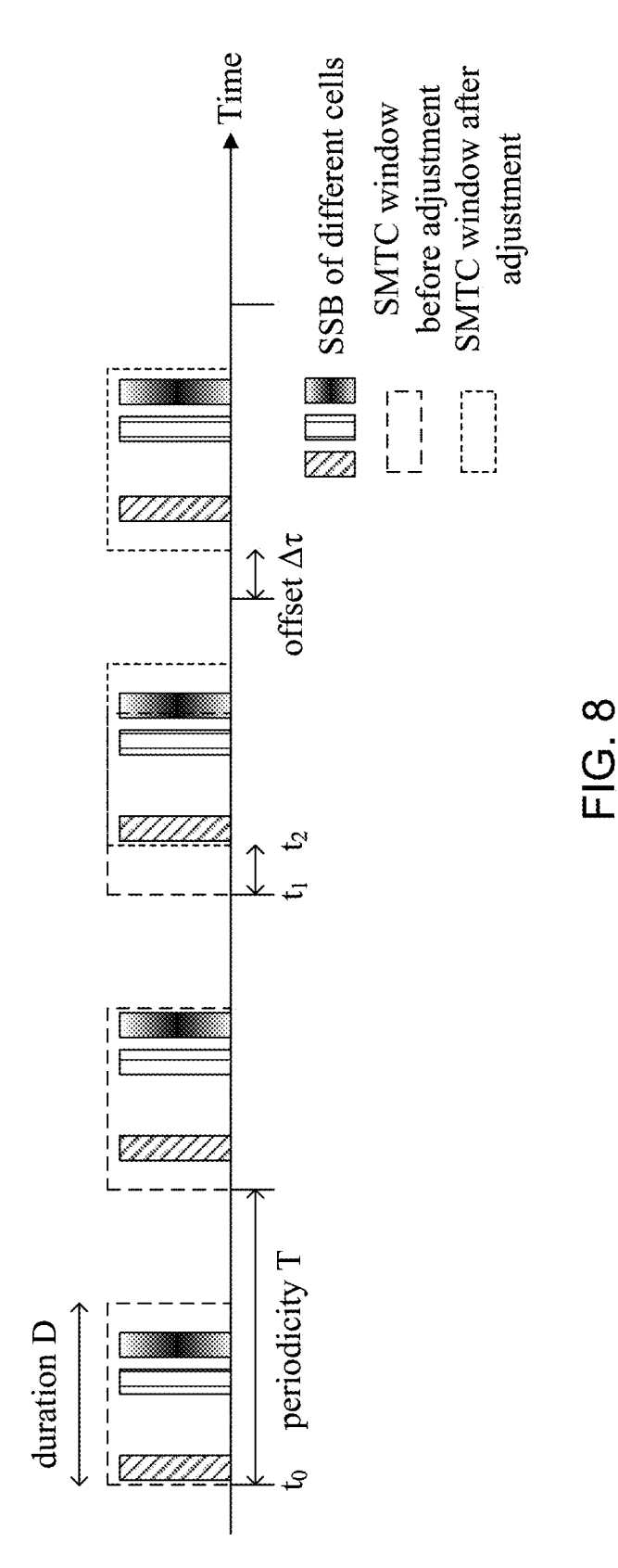
FIG. 8 illustrates an example of SMTC adjustment with window shift by an offset according to embodiments of the present disclosure.

FIG. 8 illustrates an example of SMTC adjustment with window shift by an offset 800 according to embodiments of the present disclosure. An embodiment of the SMTC adjustment with window shift by an offset 800 shown in FIG. 8 is for illustration only.

In one example of SMTC adjustment, a UE can autonomously modify the periodicity, and/or the offset, and/or the duration of each SMTC configured by the network. FIG. 8 shows an example of SMTC adjustment of measurement window shift by an offset. The UE measures SSBs from different cells within SMTC window starting at $t_0$, with duration D and periodicity T.

As the movement of serving/neighbor satellite and the movement of the UE, at $t_1$ the UE cannot detect and measure SSB of one cell that is specified in the list of PCIs to measure (710), or at $t_1$ the UE performs periodical adjustment by calculating the difference, denoted $\tau$, between the propagation delay of the cell currently undetectable and the stored propagation delay value (712) and confirming that propagation delay difference T is larger than the offset threshold (714), the UE defers the start of measurement window to $t_2$ by shifting an offset T, i.e., $t_2 = t_1 + \tau$ mod T Alternatively, the UE can determine the shifting offset based on the difference between the current propagation delay of serving cell and the current propagation delay(s) of neighbor cells.

In another example of SMTC adjustment, a UE can choose suitable values of periodicity, and/or offset, and/or duration for each SMTC adjustment from the set of candidate values provided by the network. One alternative is that the system information includes lists of {threshold, offset shifting value}, or lists of {threshold, offset value}, or lists of {threshold, scaling factor}. The UE calculates propagation delay for the serving cell and each neighboring cell based on satellite ephemeris and the UE's location information. If the difference between the delay of neighboring cell and the delay of serving cell is larger than the threshold, the UE uses the associated configured offset shifting value or offset value or scaled duration/periodicity by the associated configured scaling factor.

Otherwise, the UE uses the default SMTC/Gap configuration without any shifting or modification. Another alternative way is the system information includes lists of {threshold, SMTC/Gap configuration}, then the UE uses the associated SMTC/Gap configuration according to the propagation delay difference between the serving cell and each neighboring cell.

To determine the propagation delay difference between the serving cell and a neighbor cell, it can be contained in the assistance information provided by the network, or a UE can calculate it based on location and assistance information, e.g., satellite ephemeris and feeder link delay.

In one example, based on the UE's location and ephemeris of serving satellite and neighbor satellite, the UE can derive the service link delay to the serving cell and the service link delay to the neighbor cell, i.e., the propagation delay between the UE and the serving satellite and the propagation delay between the UE and the neighbor satellite, denoted by $a_s$ and $a_n$. If the network provides assistance information including feeder link delay of the serving cell and the feeder link delay of the neighbor cell, i.e., the propagation delay between the gNB and the serving satellite and the propagation delay between the gNB and the neighbor satellite, denoted $b_s$ and $b_n$, the UE can calculate the propagation delay difference between the serving cell and a neighbor cell as $(a_s+b_s)-(a_n+b_e)$.

In another case, if the network provides assistance information including feeder link delay difference between the serving cell and the neighbor cell with positive or negative sign, denoted $\Delta b_{sn}$, the UE can calculate the propagation delay difference between the serving cell and a neighbor cell as $a_s-a_n+\Delta b_{sn}$. Alternatively, if the feeder link delay is not provided or compensated by the network, UE can calculate the propagation delay difference between the serving cell and a neighbor cell as $a_s-a_n$ based on service link delay solely.

Specifically, SMTC contained in a system information blocks or an RRC messages can be introduced as follows, where pci-List, validity, and offsetThres are included optionally as in the aforementioned embodiments. Moreover, periodicities and offsets are included optionally so that UE can choose suitable periodicity and offset from candidate values if presented based on the varying propagation delay and adjust SMTC window, accordingly, as shown in TABLE 1.

TABLE 1

| SMTC |
|---|
| smtc-r17   SEQUENCE (SIZE(1..4)) OF SSB-MTC-r17<br>SSB-MTC-r17 ::= SEQUENCE {<br> periodicityAndOffset   CHOICE {<br>  sf5       INTEGER (0..4),<br>  sf10        INTEGER (0..9),<br>  sf20        INTEGER (0..19),<br>  sf40        INTEGER (0..39),<br>  sf80        INTEGER (0..79),<br>  sf160        INTEGER (0..159)<br> },<br> duration     ENUMERATED {sf1, sf2, sf3, sf4, sf5}<br> pci-List     SEQUENCE (SIZE (1..maxNrofPCIsPerSMTC)) OF PhysCellId   OPTIONAL, --<br>Need M<br> adjustmentPeriodicity CHOICE {sf20, sf40, sf80, sf160, sf320, sf640}   OPTIONAL, -- Need<br>M<br> offsetThres CHOICE {sf1, sf2, sf3, sf4, sf5}   OPTIONAL, -- Need M<br> periodicities   ENUMERATED {sf5, sf10, sf20, sf40, sf80, sf160, spare2, spare1}<br>OPTIONAL, -- Need M<br> offsets   ENUMERATED (0..159)   OPTIONAL, -- Need M<br>} |

FIG. 9 illustrates a flowchart of method 900 for a SMTC(s)/measurement gap(s) adjustment with assistance information in system information for a UE in an idle/inactive state according to embodiments of the present disclosure. The method 900 as may be performed by a UE (e.g., 111-116 as illustrated in FIG. 1) and a base station (e.g., 101-103 as illustrated in FIG. 1). An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

For one more embodiment as shown in FIG. 9, the UE can determine the varying propagation delay difference between the serving cell and a neighbour cell based on the assistance information broadcasted in the serving cell information, including the feeder link delay difference at an epoch time, and/or the change rate of the feeder link delay difference, and/or the rate variation of the feeder link delay (902). Specifically, the propagation delay includes the service link delay and the feeder link delay. The service link delay of the serving/neighbor cell for any time instance can be determined by the UE based on the UE's location information and the ephemeris information broadcasted in the serving/neighbor cell system information. Then, the service link delay difference between the serving cell and a neighbor cell can be determined for a certain time instance, which is denoted $d_s(t)$.

In one example, in step 904, given the feeder link delay difference at an epoch time between the serving cell and each neighbor cell to be measured, which is denoted $d_f(t_{epoch})$, and/or the change rate of the feeder link delay difference, denoted $rd_f$, and/or the rate variation of the feeder link delay, denoted $vd_f$, the UE can determine the SMTC offset at time instance t between the serving cell and a neighbor cell by: $O(t)=d_s(t)+d_f(t_{epoch})+rd_f(t-t_{epoch})+vd_f(t-t_{epoch})^2$.

In one example, in step 904, without the rate variation of the feeder link delay, the UE can determine the SMTC offset at time instance t between the serving cell and a neighbor cell by: $O(t)=d_s(t)+d_f(t_{epoch})+rd_f(t-t_{epoch})$.

In one example, in step 904, without the change rate nor the rate variation of the feeder link delay, the UE can determine the SMTC offset at time instance t between the serving cell and a neighbor cell by: $O(t)=d_s(t)+d_f(t_{epoch})$, where the feeder link delay at the epoch time can be valid for a certain duration and the validity duration can be provided in the assistance information. Based on the SMTC offset between the serving cell and the neighbor cell, the UE detects and measures SSBs of the serving cell and the neighbor cell within the measurement window (906).

In one example, in step 902, the assistance information for SMTC can be broadcasted in SIB3 for intra-frequency cell reselection and/or SIB4 for inter-frequency cell reselection, where a list of SMTC assistance information are configured with each SMTC assistance information associated with one or more neighbour cell logical IDs and/or PCIs and each SMTC assistance information including an epoch time, and/or the feeder link delay difference, and/or the change rate of the feeder link delay difference, and/or the rate variation of the feeder link delay, and/or an validity duration.

The epoch time of feeder link delay difference and/or the validity duration, for example, may or may not be the same as the epoch time and/or the validity duration of serving/neighbor cell ephemeris, which can be up to the network implementation.

FIG. 10 illustrates a flowchart of method 1000 for a SMTC(s)/measurement gap(s) adjustment based on system information modification for a UE in an idle/inactive state according to embodiments of the present disclosure. The method 1000 as may be performed by a UE (e.g., 111-116 as illustrated in FIG. 1) and a base station (e.g., 101-103 as illustrated in FIG. 1). An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

In another embodiment, a UE in an idle/inactive state adjusts SMTC(s) window and corresponding measurement gap(s) based on the UE's location and configuration updates in system information modification that is notified in short message. As shown in FIG. 10, at 1002, a UE acquires the location information of a reference point from serving cell system information and/or system information modification notified by Short Message.

At 1004, the UE receives one or more SMTCs including periodicities, and/or offsets, and/or durations of measurement windows and/or adjustment configurations to be applied for the UE in various distances away from the reference point. At 1006, the UE acquires location information and calculates the distance to the reference point. The UE location information can be obtained via GNSS for GNSS-capable UE or via network-assisted positioning for GNSS-incapable UE. At 1008, the UE applies the SMTC adjustment associated with the distance and detects and measures SSBs within the measurement window. At 1010, the UE periodically updates the UE's distance to the reference point and applies SMTC adjustment associated with the updated distance and detects and measures SSBs within the measurement window.

Specifically, in an example the reference point can be the center point of the serving cell which can be an earth-quasi fixed or earth moving cell. The network partitions the coverage area of a cell into multiple portions. Each portion is mapped to a distance level to the reference point, corresponding to a distance index and associating with a specific SMTC adjustment configuration for the cell. A UE determines the UE's distance to the reference point, rounds it to the nearest distance level, and applies the associated SMTC adjustment if needed, where the adjustment up to network configuration can be shifting the window by an offset and/or extending the duration and/or changing the periodicity.

Based on the movement of serving/neighbor satellite, the reference point position and SMTC(s) adjustment configurations can be modified by the network and sent to the UE in the updated system information. The indication of system information modification can be sent via short message so that the UE can receive modified system information over time when the UE is in an idle/inactive state. As an example, SMTC contained in serving cell system information can be introduced as follows, where distanceIndexAndOffset is introduced that each distance index represents a distance level from UE location to the reference point and associates with an adjustment of SMTC, e.g., SMTC window shift by an offset, as shown in TABLE 2.

TABLE 2

| SMTC |
| --- |
| smtc-r17   SEQUENCE (SIZE(1..4)) OF SSB-MTC-r17 |
| SSB-MTC-r17 ::= SEQUENCE { |
|   periodicityAndOffset   CHOICE { |
|     sf5               INTEGER (0..4), |
|     sf10              INTEGER (0..9), |
|     sf20              INTEGER (0..19), |
|     sf40              INTEGER (0..39), |
|     sf80              INTEGER (0..79), |
|     sf160             INTEGER (0..159) |
|   }, |
|   duration            ENUMERATED {sf1, sf2, sf3, sf4, sf5} |
|   distanceIndexAndOffset   CHOICE { |
|     Index1            INTEGER (0..4), |
|     Index2            INTEGER (0..9), |
|     Index3            INTEGER (0..19), |
|     Index4            INTEGER (0..39), |
|     Index5            INTEGER (0..79), |
|     Index6            INTEGER (0..159) |
|   },     OPTIONAL, -- Need M |
| } |

For a UE in a connected state, to accommodate varying propagation delays of serving cell and neighbor cells, in one embodiment of network-controlled method, network can determine the adjustments of SMTC(s) window and corresponding measurement gap(s) based on the assistance information reported by UE.

Figure 11:
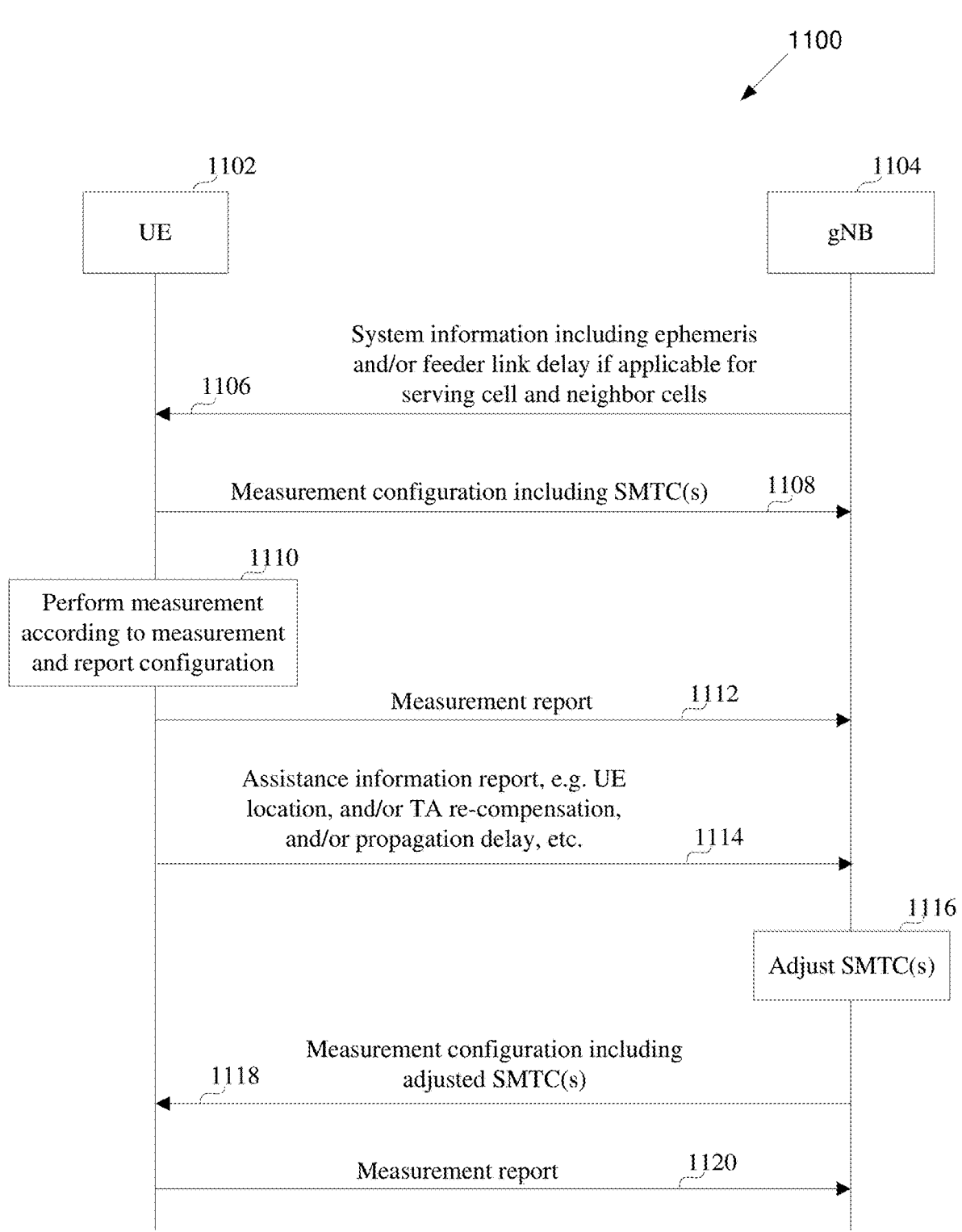
FIG. 11 illustrates a signaling flow for a network-controlled SMTC(s)/measurement gap(s) adjustment for a UE in a connected state according to embodiments of the present disclosure.

FIG. 11 illustrates a signaling flow 1100 for a network controlled SMTC(s)/measurement gap(s) adjustment for a UE in a connected state according to embodiments of the present disclosure. The signaling flow 1100 as may be performed by a UE (e.g., 111-116 as illustrated in FIG. 1) and a base station (e.g., 101-103 as illustrated in FIG. 1). An embodiment of the signaling flow 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

As shown in FIGS. 11, 1102 and 1104 represent the UE and the serving gNB, respectively. At 1106, the UE receives system information including ephemeris and/or feeder link delay if applicable for a serving cell and neighbor cells. At 1108, the UE receives measurement configuration including SMTC(s). At 1110, the UE performs SSB measurement of serving cell and neighbor cells according to the measurement and report configuration. At 1112, the UE reports measurement results to the gNB. At 1114, the UE sends assistance information for SMTC adjustment periodically, or triggered by events.

The assistance information can include one or more of UE location information, the UE TA pre-compensation, neighbor cell propagation delays, and neighbor cell propagation delay differences, where UE TA pre-compensation, and/or neighbor cell propagation delay (difference) can be calculated by UE based on the UE's location, e.g., GNSS-based or network-assisted, and satellite ephemeris acquired at 1106. Specifically, in RRC IE ReportConfigNR trigger events for UE assistance information reporting can be introduced as below based on UE movement distance and/or propagation delay difference since the last report, where hysteresis and timeToTrigger are configured to avoid unnecessary reports due to negligible changes, as shown in TABLE 3.

TABLE 3

| Event triggering configuration | |
|---|---|
| EventTriggerConfig::= | SEQUENCE { |
| eventId | CHOICE { |
| eventDist1 | SEQUENCE { |
| dist1-Threshold | MeasTriggerQuantity, |
| hysteresis | Hysteresis, |
| timeToTrigger | TimeToTrigger |
| }, | |
| eventDelay1 | SEQUENCE { |
| delay1-Threshold | MeasTriggerQuantity, |
| hysteresis | Hysteresis, |
| timeToTrigger | TimeToTrigger |
| }, | |
| } | |

For a UE assistance information report, in one example, the network can configure UE to report location information by indicating includeCommonLocationInfo-r16 in RRC IE ReportConfigNR for periodic reporting and/or event-triggered reporting, and the UE uses IE LocationInfo to transfer available detailed location information in measurement report.

In another example, a UE can report TA-pre-compensation and/or neighbor cell propagation delays and/or neighbor cell propagation delay differences via MAC-CE. Note UE assistance information, for example including one or more of UE location information, UE TA pre-compensation, neighbor cell propagation delays, and neighbor cell propagation delay differences, can be used but not limited to assist network for SMTC adjustment. Examples of other purposes of reporting one or more of above information include assisting network to determine UL scheduling based on UE propagation delay and network-controlled mobility based on the UE location.

At 1116, network adjusts SMTC(s) based on UE assistance information and sends the adjusted SMTC(s) to UE at 1118. The adjustment can include any changes in SMTC periodicity and/or duration and/or offset and/or number of different SMTCs and/or associated PCIs to measure. At 1120, the UE applies the adjusted SMTC(s), measures SSBs accordingly, and sends measurement report.

In another embodiment of UE-based method, the network provides potential adjustment configurations in SMTC, from which a UE determines suitable adjustments and informs the network the adjusted SMTC(s).

Figure 12:
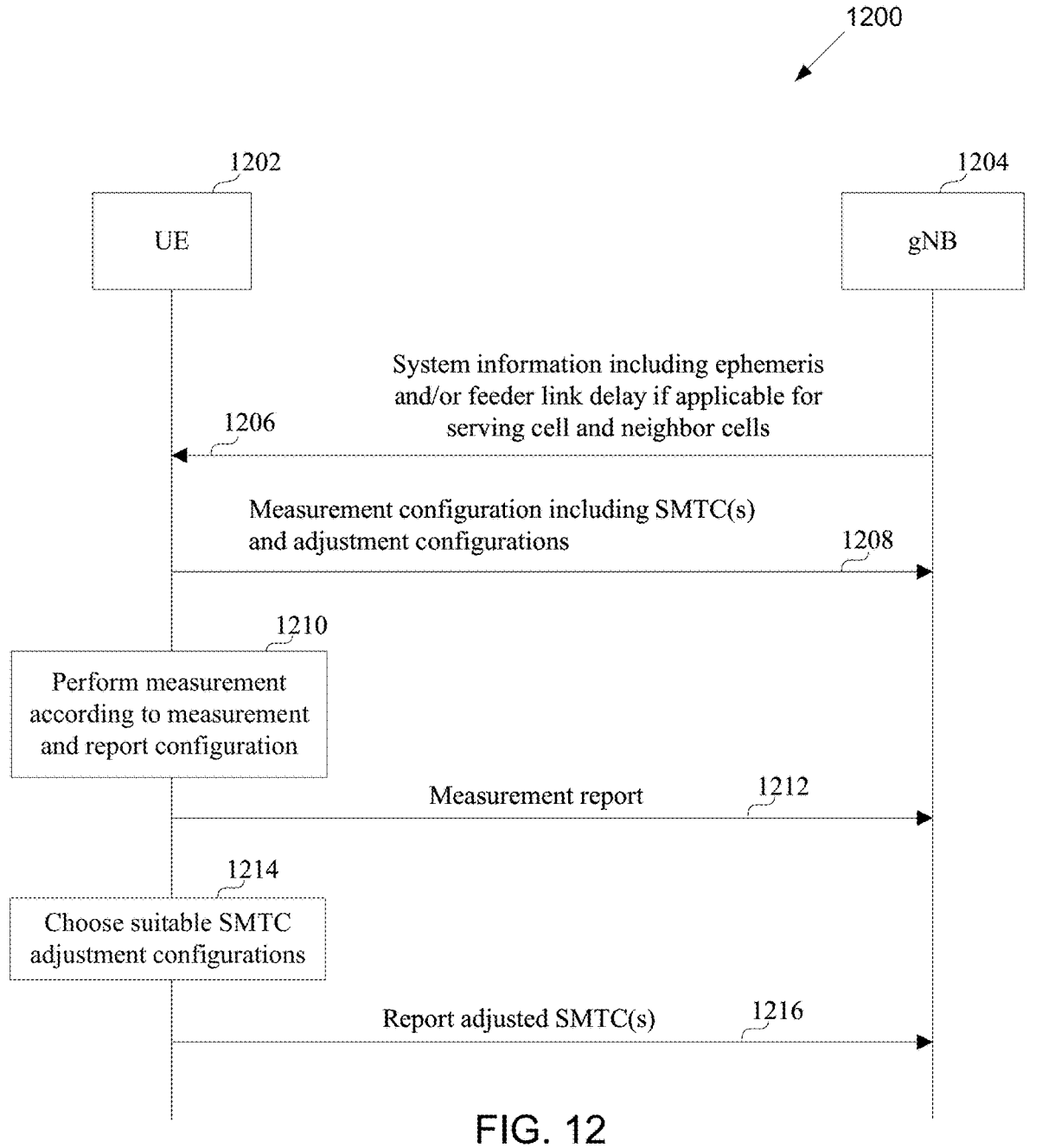
FIG. 12 illustrates a signaling flow for a UE-based SMTC (s)/measurement gap(s) adjustment for a UE in a connected state according to embodiments of the present disclosure.

FIG. 12 illustrates a signaling flow 1200 for a UE-based SMTC(s)/measurement gap(s) adjustment for a UE in a connected state according to embodiments of the present disclosure. The signaling flow 1200 as may be performed by a UE (e.g., 111-116 as illustrated in FIG. 1) and a base station (e.g., 101-103 as illustrated in FIG. 1). An embodiment of the signaling flow 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As shown in FIGS. 12, 1202 and 1204 represent the UE and the serving gNB, respectively. At 1206, the UE receives system information including ephemeris and/or feeder link delay if applicable for serving cell and neighbor cells. At 1208, the UE receives measurement configuration including SMTC(s) and adjustment configuration. At 1210, the UE performs SSB measurement of serving cell and neighbor cells according to the measurement and report configuration. At 1212, the UE reports measurement results to the gNB. At 1214, the UE adjusts SMTC periodically or triggered by events.

Similar trigger events introduced above in RRC IE ReportConfigNR can be applied. UE chooses SMTC adjustment(s), e.g., modified periodicities and/or offsets and/or durations, from the set of candidate values provided in SMTC adjustment configuration. One method to determine the adjustment is based on propagation delay difference as mentioned in the present disclosure. Candidate values of periodicities and offsets are provided to UE for SMTC adjustment as shown in the following example, as shown in TABLE 4.

TABLE 4

| SMTC |
|---|
| smtc-r17   SEQUENCE (SIZE(1..4)) OF SSB-MTC-r17 |
| SSB-MTC-r17 ::= SEQUENCE { |
| periodicityAndOffset   CHOICE { |
| sf5   INTEGER (0..4), |
| sf10   INTEGER (0..9), |
| sf20   INTEGER (0..19), |
| sf40   INTEGER (0..39), |
| sf80   INTEGER (0..79), |
| sf160   INTEGER (0..159) |
| }, |
| duration   ENUMERATED {sf1, sf2, sf3, sf4, sf5} |
| periodicities   ENUMERATED {sf5, sf10, sf20, sf40, sf80, sf160, spare2, spare1} |
| OPTIONAL, -- Need M |
| offsets   ENUMERATED (0..159)   OPTIONAL, -- Need M |
| } |

Lastly at 1216, the UE reports the SMTC adjustment made by the UE to align the SMTC configuration at both the network and the UE.

3GPP has developed technical specifications and standards to define the new 5G radio-access technology, known as 5G NR. In Release 17 specification, the NTN is supported as a vertical functionality by 5G NR. An NTN providing non-terrestrial NR access to the UE by means of an NTN payload, e.g., a satellite, and an NTN gateway as illustrated in 3GPP standard specification. The NTN payload transparently forwards the radio protocol received from the UE (via the service link, i.e., wireless link between the NTN payload and UE) to the NTN gateway (via the feeder link, i.e., wireless link between the NTN gateway and the NTN payload) and vice-versa.

Considering its capabilities of providing wide coverage and reliable service, an NTN is envisioned to ensure service availability and continuity ubiquitously. For instance, an NTN can support communication services in unserved areas that cannot be covered by conventional terrestrial networks, in underserved areas that are experiencing limited communication services, for devices and passengers on board moving platforms, and for future railway/maritime/aeronautical communications as illustrated in 3GPP standard specification.

To support NTN in 5G NR, various features need to be introduced or enhanced to accommodate the nature of radio access to NTN that is different to TN such as large cell coverage, long propagation delay, and non-static cell/satellite. In order to enable radio access to NTN, the UE needs to support certain features by implementing and testing new functionalities for various application scenarios as illustrated in 3GPP standard specification.

In Release 17 specifications, the NTN-related features need to be specified to be either mandatory or optional to be supported by a UE considering different application scenarios. For some optional features, a UE capability indication is required by the network to schedule and allocate resources properly. These UE capability indications need to be defined.

The present disclosure specifies the UE capabilities on some NTN-related features for various application scenarios and defined the corresponding indication. Specifically, UE capabilities for supporting geosynchronous orbit (GSO) and/or non-geosynchronous orbit (NGSO) satellites, SMTC and measurement gaps adjustment, and location reporting are included.

Figure 13:
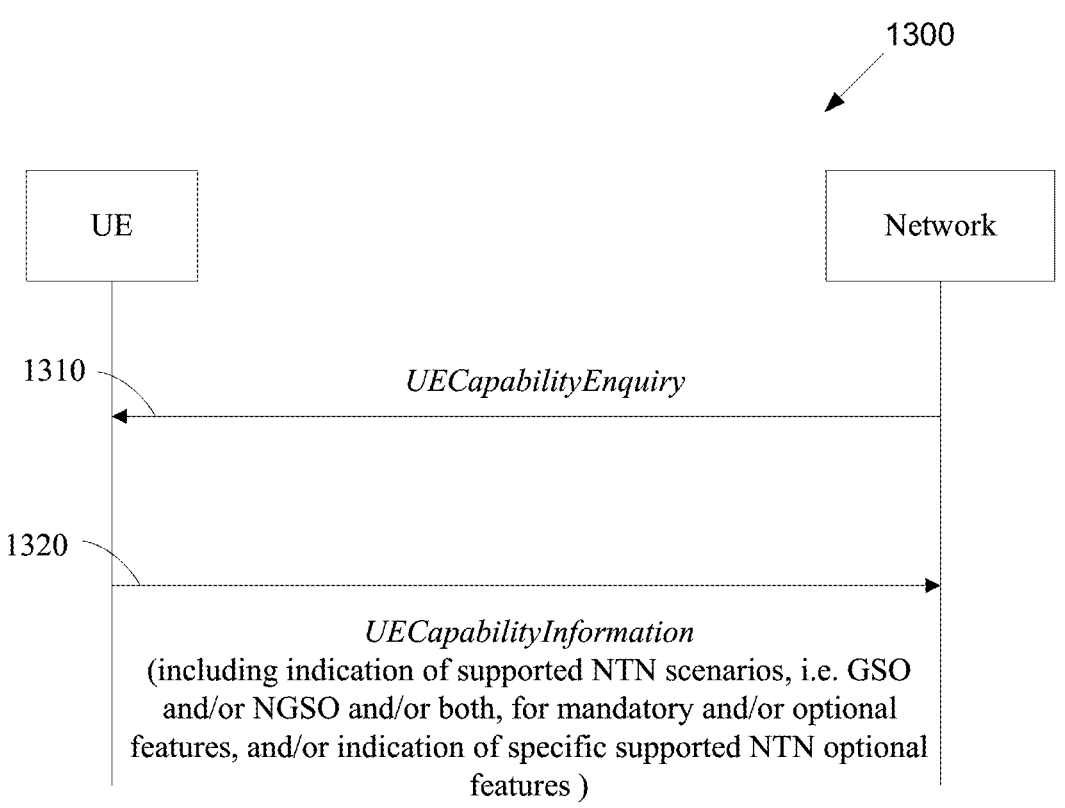
FIG. 13 illustrates a signaling flow for an NTN-related UE capability transfer according to embodiments of the present disclosure.

In an NTN, the NTN payload can be GSO, i.e., earth-centered orbit at approximately 35786 kilometers above Earth's surface and synchronized with Earth's rotation, or NGSO, i.e., LEO at altitude approximately between 300 km the present disclosure. The signaling flow 1300 as may be performed by a UE (e.g., 111-116 as illustrated in FIG. 1) and a base station (e.g., 101-103 as illustrated in FIG. 1). An embodiment of the signaling flow 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

After access stratum (AS) security is setup, the network can request the UE to provide radio access capability information (1310) by sending an UECapabilityEnquiry message, as shown in FIG. 13. The UE replies with an UECapabilityInformation message.

In one embodiment, in IE UE-NR-Capability in the UECapabilityInformation message the UE can provide its capability information on the supported NTN scenarios by including the IoT bit indicating the support of GSO and/or NGSO, and/or bits indication the supported NTN related optional features (1320).

An indication of UE capability of supporting GSO and/or NGSO may be defined. The UE capability indication of supporting GSO and/or NGSO can be defined per UE, i.e., the UE indicating supporting GSO or NGSO or both is tested to support mandatory and/or optional features of GSO or NGSO or both, respectively. For example, in RRC IE UE-NR-Capability, as illustrated in 3GPP standard specification, bits can be defined to indicate whether the UE supports GSO or NGSO or both. TABLE 5 shows the UE-NR capability.

TABLE 5

| UE-NR capability |
| --- |
| UE-NR-Capability-v17x0 ::= SEQUENCE {<br>   nonTerrestrialNetwork-r17   ENUMERATED {supported}    OPTIONAL,<br>   ntnPayloadType       ENUMERATED {GSO, NGSO, both}    OPTIONAL<br>} | and 1500 km and medium earth orbit (MEO) at altitude approximately between 7000 km and 25000 km. Depending on different NTN payloads, three types of service links are supported: (1) earth-fixed: provisioned by beam(s) continuously covering the same geographical areas all the time (e.g., the case of GSO satellites); (2) quasi-Earth-fixed: provisioned by beam(s) covering one geographic area for a limited period and a different geographic area during another period (e.g., the case of NGSO satellites generating steerable beams); and (3) earth-moving: provisioned by beam(s) whose coverage area slides over the Earth surface (e.g., the case of NGSO satellites generating fixed or non-steerable beams).

With NGSO satellites, the gNB can provide either quasi-Earth-fixed cell coverage or Earth-moving cell coverage, while gNB operating with GSO satellite can provide Earth fixed cell coverage. Due to different properties of GSO and NGSO, different types of cells can be supported in NTN, which are the earth-fixed cell, the quasi-earth-fixed cell, and the earth-moving cell. For a certain type of NTN payload/cell, specific features or functionalities are required to be supported by the UE for radio access.

FIG. 13 illustrates a signaling flow 1300 for an NTN-related UE capability transfer according to embodiments of In another embodiment, considering for each band the NTN features can be implemented and tested for either GSO or NGSO or both, the UE capability indication can also be defined per band, i.e., the UE indicating supporting GSO or NGSO or both in a band is tested to support mandatory and/or optional features of GSO or NGSO or both in this band, respectively.

For one embodiment, certain NTN features can be different to FR1 and FR2 since different Doppler effects can be caused by different speeds of satellite movements. Accordingly, separate UE capability indications of supporting GSO and/or NGSO for FR1 and FR2 are required, i.e., the UE capability of supporting GSO and/or NGSO can be different for FR1 and FR2. For one another embodiment, the UE capability of supporting GSO and/or NGSO can be different for TDD and FDD considering the long propagation delay in NTN can impact the performance of TDD and FDD system differently.

Alternatively, the UE capability of supporting different types of NTN cells can be defined per UE, i.e., indication of supporting earth-fixed cell, and/or quasi-earth-fixed cell, and/or earth-moving cell. TABLE 6 shows the UE-NR capability.

TABLE 6

| UE-NR capability |
| --- |
| UE-NR-Capability-v17x0 ::= SEQUENCE {<br>  nonTerrestrialNetwork-r17 ENUMERATED {supported} OPTIONAL,<br>  ntnCellType ENUMERATED {fixed, quasi-fixed, moving} OPTIONAL<br>} |

For other embodiments, the UE capability of supporting different types of NTN cells can be defined per band, and/or be different to FR1 and FR2, and/or be different to TDD and FDD.

For the UE support both GSO and NGSO NTN systems, the mobility, e.g., handover, between cells in GSO and NGSO NTN system needs to be considered. The UE capability of the mobility between GSO and NGSO cells can be defined separately since the UE supporting both GSO and NGSO may only support each one independently and the mobility between GSO and NGSO may need the UE to support GSO and NGSO at the same time. Thus, the UE capability indication for the mobility between GSO and NGSO is required.

In one embodiment, the "support" indication is defined that that the UE supports the mobility operations from GSO cells to NGSO cells and from NGSO cells to GSO cells. TABLE 7 shows the UE-NR capability.

TABLE 7

| UE-NR capability |
| --- |
| UE-NR-Capability-v17x0 ::= SEQUENCE {<br>  nonTerrestrialNetwork-r17 ENUMERATED {supported} OPTIONAL,<br>  ntnMobilityGSO-NGSO ENUMERATED {supported} OPTIONAL<br>} |

In another embodiment, finer UE capability indications can be defined, that is, one UE capability indication for whether the mobility operations from GSO cells to NGSO cells is supported or not, another UE capability indication for whether the mobility operations from NGSO cells to GSO cells is supported or not. In both embodiments, any of these UE capabilities can be per UE or per band. In one more embodiment, these UE capabilities can be different for FR1 and FR2.

Similarly, for the mobility between different type of cells, i.e., earth-fixed cells, quasi-earth-fixed cells, and earth-moving cells, UE capabilities can be defined. In one embodiment, an indication of supporting the mobility between different type of cells can be defined that UE supports the mobility from any type of cells to any type of cells. TABLE 8 shows the UE-NR capability.

TABLE 8

| UE-NR capability |
| --- |
| UE-NR-Capability-v17x0 ::= SEQUENCE {<br>  nonTerrestrialNetwork-r17 ENUMERATED {supported} OPTIONAL,<br>  ntnMobilityCellTypes ENUMERATED {supported} OPTIONAL<br>} |

In another embodiment, the UE capability indication of supporting mobility from one type of cells to another type of cells is defined separately, i.e., from earth-fixed cells to earth-quasi-fixed cells, from earth-quasi-fixed cells to earth-fixed cells, from earth-fixed cells to earth-moving cells, from earth-moving cells to earth-fixed cells, from earth-quasi-fixed cells to earth-moving cells, from earth-moving cells to earth-quasi-fixed cells. Any of these UE capabilities can be per UE or per band. In one more embodiment, these UE capabilities can be different for FR1 and FR2.

One feature introduced for an NTN is the adjustment of SS/PBCH blocks (SSB) measurement timing configuration (SMTC). The SMTC adjustment is to accommodate the shifting SSBs measured in the SMTC window due to the dynamic propagation delay caused by the movement of satellite. To align with the SMTC adjustment, the measurement gap needs to be adjusted as well, thus, multiple concurrent measurement gaps (MGs) are introduced and supported. Accordingly, the UE capability of supporting multiple concurrent SMTCs and/or MGs needs to be defined. Either to be defined per UE or per band, the UE capability indication for the number of supported concurrent SMTCs and/or MGs can be specified as in the following example, where the maximum number of supported concurrent SMTCs and MGs can be 4 and 2, respectively. TABLE 9 shows the UE-NR capability.

TABLE 9

| UE-NR capability |
|---|
| UE-NR-Capability-v17x0 ::=   SEQUENCE {<br>    nonTerrestrialNetwork-r17   ENUMERATED {supported}      OPTIONAL,<br>    ntnMaxSMTC        ENUMERATED {1,2,3,4}       OPTIONAL,<br>    ntnMaxMG        ENUMERATED {1,2}       OPTIONAL<br>} |

In other embodiments, the UE capability of supporting multiple concurrent SMTCs and/or MGs can be different to FR1 and FR2, and/or different to TDD and FDD.

On the other hand, for the SMTC/MG adjustment, different UE capabilities are required for a UE in a connected mode and in an idle/inactive mode. For example, the UE in the connected mode needs to report event-triggered assistance information to the network for SMTC and/or MG configuration update, while the UE in the idle/inactive mode needs to adjust SMTC and/or MG by itself based on network assistance information. Therefore, different SMTC and/or MG adjustment UE capabilities for the connected mode and the idle/inactive mode can be defined.

In one embodiment, the UE capability of supporting SMTC and/or MG adjustment assistance information report in a connected mode for GSO and/or NGSO NTN system can be mandatory which does not need an indication. The UE capability of supporting UE-based SMTC and/or MG adjustment according to network assistance information in the idle/inactive mode for GSO and/or NGSO NTN system can be mandatory as well.

In another embodiment, the UE capability of supporting SMTC and/or MG adjustment assistance information report in a connected mode for GSO and/or NGSO NTN system can be optional which needs indications per UE or per band. The UE capability of supporting UE-based SMTC and/or MG adjustment according to network assistance information in the idle/inactive mode for GSO and/or NGSO NTN system can be optional with indications per UE or per band. TABLE 10 shows the UE-NR capability.

TABLE 10

| UE-NR capability |
|---|
| UE-NR-Capability-v17x0 ::=   SEQUENCE {<br>    nonTerrestrialNetwork-r17   ENUMERATED {supported}      OPTIONAL,<br>    ntnSMTC-UEauto   ENUMERATED {supported}      OPTIONAL,<br>    ntnMaxMG-UEauto   ENUMERATED {supported}      OPTIONAL<br>} |

One more NTN-related feature is a UE location reporting to provide assistance information to the base station for system configuration. The UE location reporting with different location granularity can be configured differently in initial access and/or in a connected mode considering the security and privacy requirements. The UE capability of supporting location reporting can be defined per UE or per band.

For other embodiments, the UE capability of supporting location reporting can be defined for an initial access and/or for a connected mode, and/or for different granularities. For example, the UE can indicate that the UE supports relative coarse location reporting in an initial access and/or finer location reporting in a connected mode. TABLE 11 shows the UE-NR capability.

TABLE 11

| UE-NR capability |
|---|
| UE-NR-Capability-v17x0 ::=   SEQUENCE {<br>    nonTerrestrialNetwork-r17   ENUMERATED {supported}      OPTIONAL,<br>    ntnLocationReport   SEQUENCE {<br>      initial   ENUMERATED {1m, 10m, 100m, 500m, 1km, 10km}      OPTIONAL,<br>      connected   ENUMERATED {1m, 10m, 100m, 500m, 1km, 10km}<br>    OPTIONAL<br>    }<br>} |

In one embodiment, the UE capability of supporting location reporting can be different to FR1 and FR2, and/or different to TDD and FDD.

Figure 14:
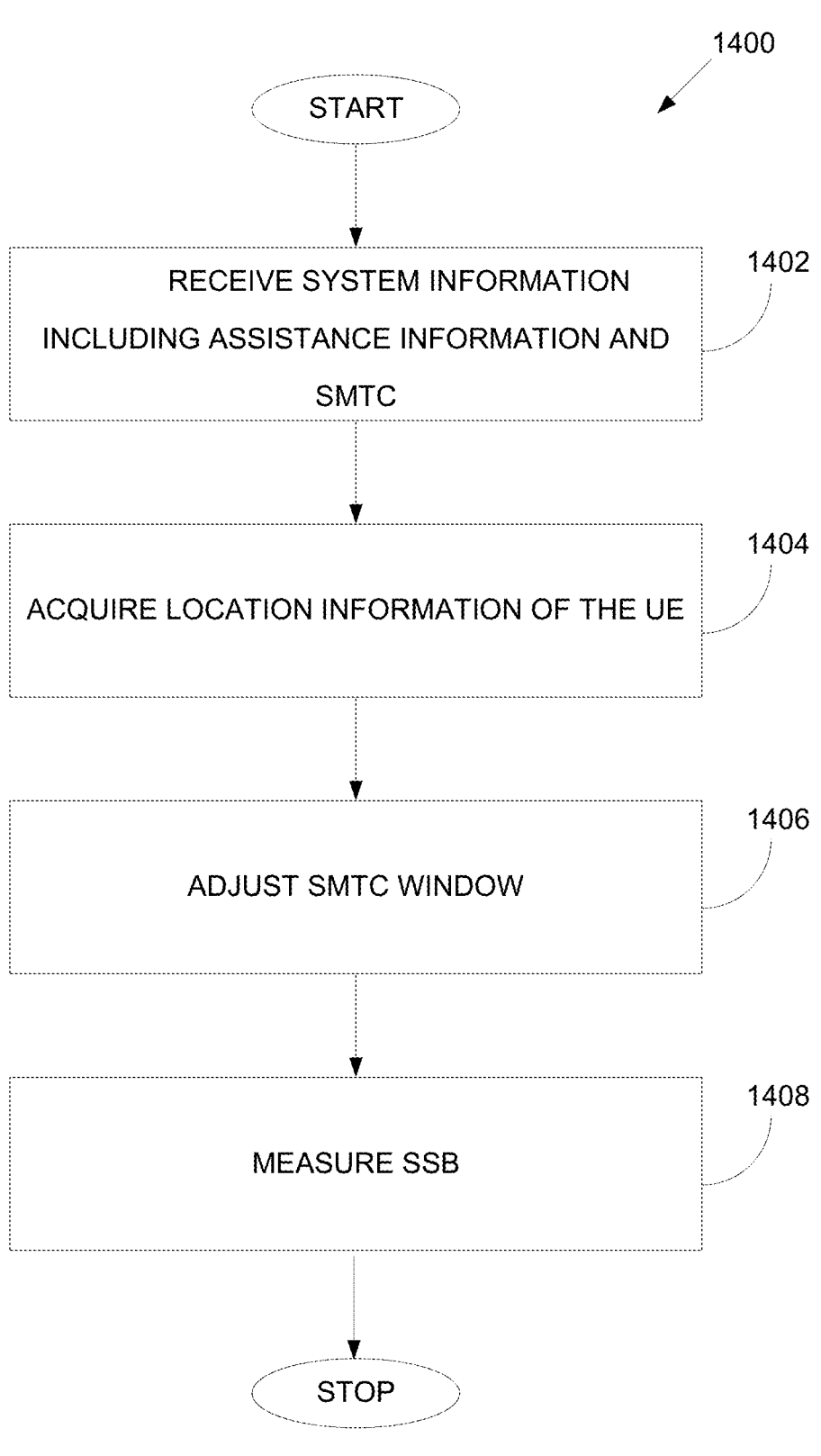
FIG. 14 illustrates a flowchart of method for an adjustment of SS/PBCH block based measurement timing configuration according to embodiments of the present disclosure.

FIG. 14 illustrates a flowchart of method 1400 for an adjustment of SS/PBCH block based measurement timing configuration according to embodiments of the present disclosure. The method 1400 as may be performed by a UE (e.g., 111-116 as illustrated in FIG. 1. An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

As illustrated in FIG. 14, in step 1402, a UE receives system information including assistance information and an SMTC including offsets for one or more SMTC windows.

In such embodiment, the assistance information of the neighboring cell is identified based on a neighbor cell physical cell identifier (PCI).

Subsequently, in step 1404, the UE acquires location information of the UE.

In such embodiment, the location information of the UE is identified via GNSS for GNSS-capable UE or network-assisted positioning information for GNSS-incapable UE.

Next, in step 1406, the UE adjusts, based on a propagation delay difference between the serving cell and a neighboring cell determined by the assistance information and the location information, the offsets for one or more SMTC window.

Finally, in step 1408, the UE measures SSBs received from a neighboring cell within the adjusted one or more SMTC window.

In one embodiment, the UE identifies, from the assistance information, ephemeris information, a validity of duration, and an epoch time for a serving cell and one or more neighboring cells.

In one embodiment, the UE identifies the propagation delay difference between the serving cell and the neighboring cell is determined based on: $(a_s+b_s)-(a_n+b_n)$ where $a_s$ is a service link delay to the serving cell, $b_s$ is a feeder link delay to the serving cell and is determined based on feeder link delay parameters for the serving cell, $a_n$ is a service link delay to the neighboring cell, and $b_n$ is a feeder link delay to the neighboring cell and is determined based on feeder link delay parameters for the neighboring cell.

In one embodiment, the UE identifies, from the assistance information, feeder link delay parameters including a feeder link delay at an epoch time and a change rate of the feeder link delay and a rate variation of the feeder link delay.

In one embodiment, the UE identifies an offset threshold to determine whether the propagation delay difference is larger than the offset threshold and adjusts one or more SMTC windows and measuring the SSB based on a determination that the propagation delay difference is larger than the offset threshold.

In one embodiment, the UE transmits UE capability information indicating whether the UE is capable of supporting at least one of a GSO-NTN operation or a non-GSO NTN operation.

In one embodiment, the UE transmits UE capability information indicating whether the UE is capable of supporting an SMTC adjustment assistance information report including the propagation delay difference, wherein the propagation delay difference indicates a service link delay difference between a serving cell and the neighboring cell.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
   a transceiver configured to receive system information including assistance information and a synchronization signal/physical broadcast channel block (SSB)-based measurement timing configuration (SMTC) including offsets for one or more SMTC windows; and
   a processor operably coupled to the transceiver, the processor configured to:
   acquire location information of the UE,
   determine, based on the assistance information and the location information, a propagation delay difference between a serving cell of the UE and a neighboring cell,
   determine, based on the assistance information, whether the UE is in an idle mode or an inactive mode and whether the UE is capable of SMTC adjustment,
   adjust, based on the propagation delay difference, the offsets for one or more SMTC windows based on a determination that the UE is in the idle mode or the inactive mode and is capable of the SMTC adjustment, and
   measure SSBs received from a neighboring cell within the adjusted one or more SMTC windows.

2. The UE of claim 1, wherein the location information of the UE is identified via global navigation satellite systems (GNSS) for GNSS-capable UE or network-assisted positioning information for GNSS-incapable UE.

3. The UE of claim 1, wherein the processor is further configured to identify, from the assistance information, ephemeris information, a validity of duration, and an epoch time for a serving cell and one or more neighboring cells.

4. The UE of claim 1, wherein the assistance information of the neighboring cell is identified based on a neighbor cell physical cell identifier (PCI).

5. The UE of claim 1, wherein the propagation delay difference, between the serving cell and the neighboring cell is determined based on: ("a"_"s"+"b"_"s")–$(a_n+b_n)$ where $a_s$ is a service link delay to the serving cell, $b_s$ is a feeder link delay to the serving cell and is determined based on feeder link delay parameters for the serving cell, $a_n$ is a service link delay to the neighboring cell, and $b_n$ is a feeder link delay to the neighboring cell and is determined based on feeder link delay parameters for the neighboring cell.

6. The UE of claim 1, wherein the processor is further configured to identify, from the assistance information, feeder link delay parameters including a feeder link delay at an epoch time and a change rate of the feeder link delay and a rate variation of the feeder link delay.

7. The UE of claim 1, wherein the processor is further configured to:

identify an offset threshold to determine whether the propagation delay difference is larger than the offset threshold; and adjust the one or more SMTC windows and measure SSBs based on a determination that the propagation delay difference is larger than the offset threshold.

8. The UE of claim 1, wherein the transceiver is further configured to transmit UE capability information indicating whether the UE is capable of supporting at least one of a geosynchronous orbit (GSO) non-terrestrial network (NTN) operation or a non-GSO NTN operation.

9. The UE of claim 1, wherein the transceiver is further configured to transmit UE capability information indicating whether the UE is capable of supporting an SMTC adjustment assistance information report including the propagation delay difference, and wherein the propagation delay difference indicates a service link delay difference between a serving cell and the neighboring cell.

10. A base station (BS) in a wireless communication system, the BS comprising:

a processor; and a transceiver operably coupled to the processor, the transceiver configured to transmit, to a user equipment (UE), system information including assistance information and a synchronization signal/physical broadcast channel block (SSB)-based measurement timing configuration (SMTC) including offsets for one or more SMTC windows, wherein a propagation delay difference between a serving cell of the UE and a neighbor cell is determined based on the assistance information and location information of the UE, wherein whether the UE is in an idle mode or an inactive mode and whether the UE is capable of SMTC adjustment are determined based on the assistance information, wherein the offsets for the one or more SMTC windows are adjusted based on the propagation delay difference when the UE is in the idle mode or the inactive mode and the UE is capable of the SMTC adjustment, and wherein SSBs of a neighboring cell are measured within the adjusted one or more SMTC windows.

11. The BS of claim 10, wherein the transceiver is further configured to:

receive UE capability information indicating whether the UE is capable of supporting at least one of a geosynchronous orbit (GSO) non-terrestrial network (NTN) operation or a non-GSO NTN operation;

receive UE capability information indicating whether the UE is capable of supporting an SMTC adjustment assistance information report including a propagation delay difference; and the propagation delay difference indicates a service link delay difference between a serving cell and the neighboring cell.

12. A method of a user equipment (UE) in a wireless communication system, the method comprising:

receiving system information including assistance information and a synchronization signal/physical broadcast channel block (SSB)-based measurement timing configuration (SMTC) including offsets for one or more SMTC windows;

acquiring location information of the UE;

determining, based on the assistance information and the location information, a propagation delay difference between a serving cell of the UE and a neighboring cell;

determining, based on the assistance information, whether the UE is in an idle mode or an inactive mode and whether the UE is capable of SMTC adjustment;

adjusting, based on the propagation delay difference, the offsets for the one or more SMTC windows based on a determination that the UE is in the idle mode or the inactive mode and that the UE is capable of the SMTC adjustment; and measuring SSBs received from a neighboring cell within the adjusted one or more SMTC windows.

13. The method of claim 12, wherein the location information of the UE is identified via global navigation satellite systems (GNSS) for GNSS-capable UE or network-assisted positioning information for GNSS-incapable UE.

14. The method of claim 12, further comprising: identifying, from the assistance information, ephemeris information, a validity of duration, and an epoch time for a serving cell and one or more neighboring cells.

15. The method of claim 12, wherein the assistance information of the neighboring cell is identified based on a neighbor cell physical cell identifier (PCI).

16. The method of claim 12, wherein the propagation delay difference between the serving cell and the neighboring cell is determined based on: ("a"_"s"+"b"_"s")−(a$_n$+b$_n$) where a$_s$ is a service link delay to the serving cell, b$_s$ is a feeder link delay to the serving cell and is determined based on feeder link delay parameters for the serving cell, a$_n$ is a service link delay to the neighboring cell, and b$_n$ is a feeder link delay to the neighboring cell and is determined based on feeder link delay parameters for the neighboring cell.

17. The method of claim 12, further comprising identifying, from the assistance information, feeder link delay parameters including a feeder link delay at an epoch time and a change rate of the feeder link delay and a rate variation of the feeder link delay.

18. The method of claim 12, further comprising:

identifying an offset threshold to determine whether the propagation delay difference is larger than the offset threshold; and adjusting the one or more SMTC windows and measuring SSBs based on a determination that the propagation delay difference is larger than the offset threshold.

19. The method of claim 12, further comprising: transmitting UE capability information indicating whether the UE is capable of supporting at least one of a geosynchronous orbit (GSO) non-terrestrial network (NTN) operation or a non-GSO NTN operation.

20. The method of claim 12, further comprising transmitting UE capability information indicating whether the UE is capable of supporting an SMTC adjustment assistance information report including the propagation delay difference, wherein the propagation delay difference indicates a service link delay difference between a serving cell and the neighboring cell.

\* \* \* \* \*